(12) United States Patent
Minami et al.

(10) Patent No.: US 8,529,766 B2
(45) Date of Patent: Sep. 10, 2013

(54) WATER PURIFIER AND WATER PURIFICATION METHOD

(75) Inventors: Koichi Minami, Kanagawa (JP); Morihito Ikeda, Kanagawa (JP); Hiroshi Arakatsu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 301 days.

(21) Appl. No.: 12/915,973

(22) Filed: Oct. 29, 2010

(65) Prior Publication Data

US 2011/0100913 A1    May 5, 2011

(30) Foreign Application Priority Data

Oct. 30, 2009   (JP) ................. 2009-251053
Oct. 28, 2010   (JP) ................. 2010-242273

(51) Int. Cl.
| | | |
|---|---|---|
| *B01D 11/00* | (2006.01) | |
| *B01D 61/00* | (2006.01) | |
| *B01D 3/00* | (2006.01) | |
| *C02F 1/44* | (2006.01) | |
| *C02F 1/00* | (2006.01) | |

(52) U.S. Cl.
USPC ..... 210/644; 210/651; 210/257.2; 210/195.2; 210/175; 203/10

(58) Field of Classification Search
USPC ............ 210/644, 652, 767, 257.2, 195.2, 210/651, 175, 180; 203/10
See application file for complete search history.

(56) References Cited

U.S. PATENT DOCUMENTS

| | | | | |
|---|---|---|---|---|
| 3,130,156 | A * | 4/1964 | Neff | 210/177 |
| 3,532,621 | A * | 10/1970 | Hough | 210/638 |
| 7,914,680 | B2 * | 3/2011 | Cath et al. | 210/644 |
| 8,021,549 | B2 * | 9/2011 | Kirts | 210/257.2 |
| 2005/0145568 | A1 | 7/2005 | Mc Ginnis | |
| 2010/0213129 | A1 * | 8/2010 | Jones et al. | 210/652 |
| 2010/0224561 | A1 * | 9/2010 | Marcin | 210/644 |
| 2011/0100913 | A1 * | 5/2011 | Minami et al. | 210/648 |
| 2011/0233137 | A1 * | 9/2011 | Cath et al. | 210/644 |
| 2011/0272355 | A1 * | 11/2011 | Rajagopalan et al. | 210/650 |
| 2012/0018365 | A1 * | 1/2012 | Iyer | 210/181 |
| 2012/0037566 | A1 * | 2/2012 | Achilli et al. | 210/652 |
| 2012/0118826 | A1 * | 5/2012 | Liberman et al. | 210/648 |
| 2012/0205309 | A1 * | 8/2012 | Sano et al. | 210/638 |

* cited by examiner

*Primary Examiner* — Ana Fortuna
(74) *Attorney, Agent, or Firm* — Birch, Stewart, Kolasch & Birch, LLP (57) ABSTRACT

To provide a water purifier, containing: a diluting unit configured to bring targeted water for purification into contact with an aqueous solution containing a volatile solute and a polymer via a semi-permeable membrane so as to separate water from the targeted water by the semi-permeable membrane, and configured to dilute the aqueous solution with the separated water; a separating unit configured to separate the volatile solute and the polymer from the diluted aqueous solution obtained by the diluting unit so as to obtain purified water; and a dissolving unit configured to return the separated volatile solute by the separating unit to the aqueous solution containing the polymer, and to allow the separated volatile solute to dissolve in the aqueous solution containing the polymer.

11 Claims, 5 Drawing Sheets

WATER PURIFIER AND WATER PURIFICATION METHOD

BACKGROUND OF THE INVENTION

1. Field of the Invention

The present invention relates to a water purifier and water purification method, to which a forward osmosis process using an aqueous solution containing a volatile solute and a polymer is applied.

2. Description of the Related Art

A reverse osmosis (RO) process, which uses external pressures, and a forward osmosis (FO) process have been known as methods for selectively separating and transporting water between two aqueous solutions having mutually different osmotic pressures.

One example of the forward osmosis processes is a method using a volatile ion-containing aqueous solution including volatile anions and volatile cations. For example, there is a proposal of a water purifying device such that the device contains: a diluting unit 11 configured to bring targeted water for purification into contact with a volatile ion-containing aqueous solution including volatile anions and volatile cations through a semi-permeable membrane 1, and to dilute the volatile ion-containing aqueous solution with the water separated from the targeted water by the semi-permeable membrane 1; a separating unit 15 containing a distillation column 7 configured to make the volatile anions and the volatile cations volatilize from the diluted volatile ion-containing aqueous solution by the diluting unit; and a dissolution unit 14 containing a gas absorption unit 6 configured to return and dissolve the vaporized anion and cation gases separated by the separating unit 15 to and in the diluted volatile ion-containing aqueous solution, as shown in FIG. 1 (see US Patent Application Publication No. 2005/0145568).

Figure 1:
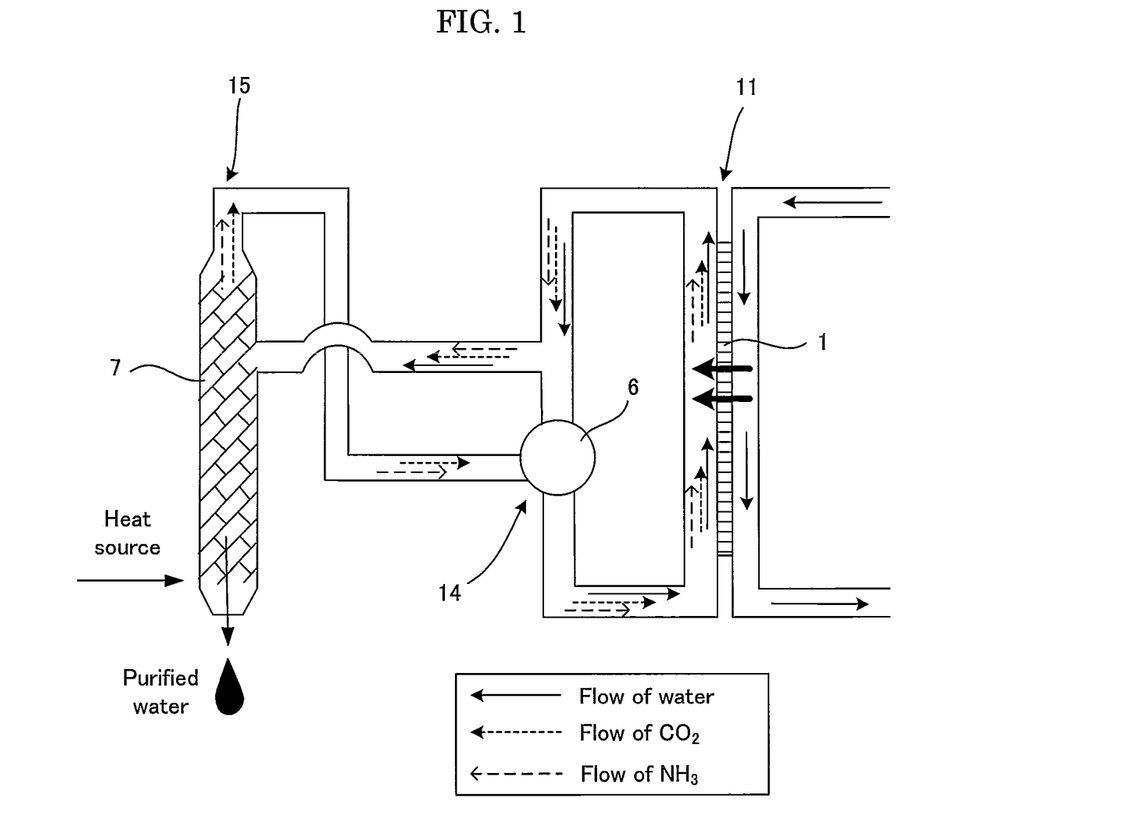
FIG. 1 is a schematic diagram showing one example of the conventional water purifier.

However, the proposed water purifying device shown in FIG. 1 has a problem such that non-polar gas components (e.g., carbon dioxide, carbonic acid that is hydrate of carbon dioxide, and ammonium) may non-selectively leak into targeted water across a semi-permeable membrane 1 when the targeted water is brought into contact with the volatile ion-containing aqueous solution, in which volatile anions and volatile cations are contained, through the semi-permeable membrane 1. Since carbon dioxide, carbonic acid that is hydrate of carbon dioxide, ammonium, and the like have the similar physical properties (e.g. molecular sizes) to those of water, it is very difficult to prevent these components from passing through the semi-permeable membrane 1, which selectively passes water through. For example, in the case where a forward osmosis permeable membrane of Hydration Technology Innovations (commercial product) is used as the semi-permeable membrane 1 in the proposed water purifying device, it has been known from the experiment that the gas is components, such as carbon dioxide, hydrate thereof (carbonic acid), and ammonium, leak at the rate of a few to several moles per square meter per hour.

If leakage is occurred at such rate, the targeted water, which will be discharged, may end up containing a large amount of carbon dioxide, hydrate thereof (carbonic acid), ammonium or the like. This adversely affects the recovering system of the water purifying device. Specifically, recycling cannot be carried out unless a large amount of an osmotic source, such as carbon dioxide or ammonium, is resupplied to the volatile ion-containing aqueous solution. For this reason, water purification cannot be performed efficiently. Since the targeted water to be discharged contains a large amount of carbon dioxide, hydrate thereof (carbonic acid) or ammonium, discharging of such targeted water may harm the environment.

Therefore, it is the current situation in the art that there is a demand for a water purifier and water purification method, which can recover purified water by an osmotic pressure while preventing leaks of a volatile solute from an aqueous solution containing the volatile solute into the targeted water, and can efficiently perform purification of water.

BRIEF SUMMARY OF THE INVENTION

The present invention aims at solving the various problems in the art, and achieving the following object. An object of the present invention is to provide a water purifier and water purification method, which achieve a desirable balance between the prevention of leaks of a volatile solute into targeted water for purification and a high penetrate water flux by an osmotic pressure, and can efficiently purify water.

To this end, the present inventors conducted numbers of studies and researches, and discovered the following findings. Namely, they have found that by using an aqueous solution containing a volatile solute together with a polymer which is not desirable as an osmosis source to the volatile solute because of this low molecular weight compared to the equal weight of other osmotic sources, both the prevention of leaks of a volatile solute into targeted water for purification and high penetrate water flux by osmotic pressure can be unexpectedly achieved at the same time.

The present invention has been made based upon the aforementioned insights of the present inventors, and means for solving the aforementioned problems are as follows:

<1> A water purifier, containing:

a diluting unit configured to bring targeted water for purification into contact with an aqueous solution containing a volatile solute and a polymer via a semi-permeable membrane so as to separate water from the targeted water by the semi-permeable membrane, and configured to dilute the aqueous solution with the separated water;

a separating unit configured to separate the volatile solute and the polymer from the diluted aqueous solution obtained by the diluting unit so as to obtain purified water; and a dissolving unit configured to return the separated volatile solute by the separating unit to an aqueous solution containing the separated polymer, and to allow the separated volatile solute to dissolve in the aqueous solution containing the polymer.

The water purifier according to <1> contains the diluting unit, the separating unit, and the dissolving unit.

The diluting unit brings the aqueous solution containing the volatile solute and the polymer into contact with the targeted water for purification via the semi-permeable membrane to separate water from the targeted water by the semi-permeable membrane, and dilutes the aqueous solution with the separated water.

The separating unit separates the volatile solute and the polymer from the diluted aqueous solution to collect purified water.

The dissolving unit returns the separated volatile solute to the aqueous solution containing the separated polymer and the returned volatile solute is made dissolve in the aqueous solution.

As a result, water purification is efficiently performed while preventing the volatile solute from leaking into the targeted water from the aqueous solution containing the volatile solute, and collecting water by osmotic pressure.

<2> The water purifier according to <1>, wherein the separating unit contains a first separating unit configured to separate the diluted aqueous solution into an aqueous solution containing the volatile solute and an aqueous solution containing the polymer, and a second separating unit configured to separate the volatile solute from the aqueous solution containing the volatile solute.

<3> The water purifier according to <2>, wherein the first separating unit is an ultrafiltration membrane.

<4> The water purifier according to any one of <1> to <3>, wherein the volatile solute is carbon dioxide, carbonic acid, or ammonium.

<5> The water purifier according to any one of <1> to <4>, wherein the polymer has a weight average molecular weight of 5,000 to 250,000.

<6> The water purifier according to any one of <1> to <5>, wherein the polymer was a weight average molecular weight of 5,000 to 130,000.

<7> The water purifier according to any one of <1> to <6>, wherein the polymer has a ratio of a molecular weight of a repeat unit therein to electric charge therein ranging from 58 to 1,000.

<8> The water purifier according to any one of <1> to <7>, wherein the dissolving unit is a gas absorber.

<9> The water purifier according to any one of <1> to <8>, wherein the semi-permeable membrane is a forward osmosis semi-permeable membrane which selectively passes water through.

<10> The water purifier according to any one of <1> to <9>, wherein the targeted water is sea-water.

<11> A water purification method, containing:
bringing targeted water for purification into contact with an aqueous solution containing a volatile solute and a polymer via a semi-permeable membrane so as to separate water from the targeted water by the semi-permeable membrane, and diluting the aqueous solution containing the volatile solute and the polymer with the separated water;
separating the volatile solute and the polymer from the diluted aqueous solution so as to obtain purified water; and
returning the separated volatile solute to an aqueous solution containing the separated polymer, and allowing the separated volatile solute to dissolve in the aqueous solution containing the polymer.

The water purification method according to <11> contains a diluting step, a separating step and a dissolving step.

The diluting step is bringing targeted water for purification into contact with an aqueous solution containing a volatile solute and a polymer via a semi-permeable membrane so as to separate water from the targeted water by the semi-permeable membrane, and diluting the aqueous solution containing the volatile solute and the polymer with the separated water.

The separating step is separating the volatile solute and the polymer from the diluted aqueous solution so as to obtain purified water.

The dissolving step is returning the separated volatile solute to the aqueous solution containing the polymer, and allowing the separated volatile solute to dissolve in the aqueous solution containing the polymer.

As a result, water purification is efficiently performed while preventing the volatile solute from leaking into the targeted water from the aqueous solution containing the volatile solute, and collecting water by osmotic pressure.

The present invention can solve the various problems in the art, and can provide a water purifier and a water purification method, which can collect purified water by osmotic pressure while preventing leaks of a volatile solute from an aqueous solution containing the volatile solute to the targeted water, and can efficiently perform water purification.

DETAILED DESCRIPTION OF THE INVENTION (Water Purifier and Water Purification Method)

The water purifier of the present invention contains a diluting unit, a separating unit, and a dissolving unit, and may further contain other units, if necessary.

The water purification method of the present invention contains a diluting step, a separating step, a dissolving step, and may further contain other steps, if necessary.

The water purification method of the present invention is suitably carried out by the water purifier of the present invention. The diluting step can be carried out by the diluting unit, the separating step can be carried out by the separating unit, the dissolving step can be carried out by the dissolving unit, and other steps can be carried out other units.

<Diluting Unit and Diluting Step>

The diluting step is bringing targeted water for purification into contact with an aqueous solution containing a volatile solute and polymer via a semi-permeable membrane so as to separate water from the targeted water by the semi-permeable membrane, and diluting the aqueous solution with the separated water. The diluting step can be carried out by the diluting unit.

-Targeted Water for Purification-

The targeted water for purification is suitably selected depending on the intended purpose without any restriction. Examples thereof include: water available in nature such as sea-water, brackish water, river water, water of lakes, water of marshes, and water of ponds; industrial waste water discharged from factories and various industrial facilities; and general sewage discharged from house holds and general facilities. Among them, sea-water is particularly preferable, because it is stably and readily available in a large amount, and there is a demand for purification of the sea-water.

In the present specification, the purified water means an aqueous solution having a small amount of impurities, such as salts. The amount of impurities can be arbitrarily set depending on the intended use of the purified water and types of impurities.

-Aqueous Solution Containing Volatile Solute and Polymer-

The aqueous solution containing a volatile solute and a polymer contains at least a volatile solute and a polymer, and may further contain other substances, if necessary.

--Volatile Solute--

The volatile solute is suitably selected depending on the intended purpose without any restriction, provided that it is a compound having higher volatility than that of water at least at a certain temperature.

The indicator of the volatility is, for example, the Henry constant of a substance at each temperature, or the fact that the substance having the higher saturated vapor pressure than that of water.

The Henry constant is a physical value showing a molar ratio of a substance and a saturated vapor pressure thereof in a solution, in which a substance is dissolved in a large amount of a solvent. The higher the value is the higher volatility the solution has. The details thereof are described, for example, in "Chemistry Manual" published by Maruzen Co., Ltd., and "Gas Absorption, the enlarged edition" published by Kagaku Kogyo Sha Co. Ltd.

The volatile solute in the aqueous solution containing the volatile solute and the polymer is either volatile anions or volatile cations.

The volatile anion is suitably selected depending on the intended purpose without any restriction. Examples thereof include carbon dioxide ($CO_2$), and sulfur dioxide ($SO_2$). Among them, carbon dioxide ($CO_2$) is particularly preferable in view of its stability, low reactivity, and availability. The volatile anion is hydrated (i.e., becoming carbonic acid) once it dissolves in water, and then is turned into anion ($HCO_3-$, $CO_3^2$, $HSO_3-$, $SO_3^{2-}$) by deprotpnation. Therefore, the term, "the volatile solute (anion)" contains a gas, hydrates of the gas, and anions thereof.

The volatile cation is suitably selected depending on the intended purpose without any restriction, but is preferably ammonium. The volatile cation is protonated to be cation ($NH^{4+}$), once it dissolves in water. Therefore, the term, "the volatile solute (cation)" also contains a gas and cations thereof.

The volatile anion or volatile cation can be suitably selected depending on the polymer for use. In the case where the polymer is an anionic polymer, the volatile solute is preferably the volatile cations. In the case where the polymer is a cationic polymer, the volatile solute is preferably the volatile anions.

An amount (concentration) of the volatile anions in the aqueous solution containing the volatile solute and the polymer is suitably adjusted depending on the intended purpose without any restriction, but the aqueous solution of high concentration is preferable since the speed for separating water from the targeted water for purification increases. However, the viscosity of the aqueous solution increases as the concentration of the polymer increases. Therefore, the aqueous solution having a high concentration of the polymer has a slow rate of separation of water. It is preferred that the volatile anions be used in the anionic state for preventing the volatile anions from leaking into the targeted water. To this end, the mixing ratio of the volatile anions and the polymer is, for example in the case where the volatile anion is carbon dioxide, adjusted so that the aqueous solution in which the polymer and carbon dioxide are mixed has a pH value of 8 or higher.

An amount (concentration) of the volatile cations in the aqueous solution containing the volatile solute and the polymer is suitably selected depending on the intended purpose without any restriction. The high concentration of the volatile cation is preferable for increasing the speed of the separation of water from the targeted water. However, the viscosity of the aqueous solution increases as the concentration of the polymer increases. Therefore, the aqueous solution having a high concentration of the polymer has a slow rate of separation of water. It is preferred that the volatile cation be used in the cationic state for preventing the volatile cations from leaking into the targeted water. To this end, the mixing ratio of the volatile cations and the polymer is, for example in the case where the volatile cation is ammonium, adjusted so that the aqueous solution in which the polymer and ammonium are mixed has a pH value of 8 or lower.

--Polymer--

The polymer is a nonvolatile polymer.

In the present specification, the nonvolatile polymer means a compound having lower volatility than that of water at least at a certain temperature.

The indicator of the volatility is, for example, the Henry constant of a substance at each temperature, or the fact that the substance having the lower saturated vapor pressure than that of water.

The Henry constant is a physical value showing a molar ratio of a substance and a saturated vapor pressure thereof in a solution, in which a substance is dissolved in a large amount of a solvent. The lower the value is the lower volatility the solution has. The details thereof are described, for example, in "Chemistry Manual" published by Maruzen Co., Ltd., and "Gas Absorption, the enlarged edition" published by Kagaku Kogyo Sha Co. Ltd.

The polymer is suitably selected depending on the intended purpose without any restriction, but it is preferably a hydrophilic polymer, and more preferably an ionic polymer. The ionic polymer is preferable, since such polymer can trap the volatile solute by an electric force, which can prevent the volatile solute from leaking into the targeted water.

The ionic polymer is suitably selected depending on the volatile solute for use. In the case where the volatile solute is volatile cations, the ionic polymer is preferably an anionic polymer. In the case where the volatile solute is volatile anions, the ionic polymer is preferably a cationic polymer.

The anionic polymer is suitably selected depending on the intended purpose without any restriction, but it is preferably a polymer containing at least one selected from the group consisting of carboxylic acid, and sulfonic acid.

The polymer containing at least one selected from the group consisting of carboxylic acid and sulfonic acid may be a monopolymer, a polymer in which a plurality of polymers are mixed, or a copolymer.

The monopolymer is suitably selected depending on the intended purpose without any restriction. Examples thereof include polyacrylic acid, polystyrene sulfonate, and polymaleic acid.

In the case where a plurality of polymers are mixed, the resulting polymer may contain a cationic polymer and/or a nonionic polymer, provided that the total electric charge of the polymer is negative (i.e. the polymer is anion, on the whole).

The copolymer is suitably selected depending on the intended purpose without any restriction. Examples thereof include a copolymer combining the aforementioned monopolymers.

The copolymer may contain a cationic component and/or a nonionic component therein, as long as the total electric charge of the copolymer is anion-rich. Among the polymer containing at least one selected from the group consisting of the carboxylic acid and the sulfonic acid, a copolymer, a mixture of monopolymers, a polymer formed of a homopolymer are preferable, the mixture of homopolymers and the polymer formed of a homopolymer are more preferable, and the polymer formed of the homopolymer is particularly preferable.

Moreover, the copolymer containing strong acid polymers such as polyvinyl sulfonate, polystyrene sulfonate, and sulfonic acid is preferable, since it contributes to ionization of the gas of the volatile solute.

The cationic polymer is suitably selected depending on the intended purpose without any restriction, but it is preferably a secondary ammonium-containing polymer, a tertiary ammonium-containing polymer, or a quaternary ammonium-containing polymer, and more preferably the quaternary ammonium-containing polymer.

The cationic polymer may be a homopolymer, a mixture of two or more polymers, or a copolymer.

The secondary ammonium-containing polymer is suitably selected depending on the intended purpose without any restriction. Examples thereof include polydiallyl amine.

The tertiary ammonium-containing polymer is suitably selected depending on the intended purpose without any restriction. Examples thereof include polydiallylmethyl amine, and polyethylene imine.

The quaternary ammonium-containing polymer is suitably selected depending on the intended purpose without any restriction. Examples thereof include polydiallyldimethyl ammonium, and polydiallylmethylethyl ammonium.

In the case of the mixture of two or more polymers, it may contain an anionic polymer, and/or a nonionic polymer, provided that the total electric charge of the polymer shows anion.

The copolymer is suitably selected depending on the intended purpose without any restriction. Examples thereof include a copolymer in which the aforementioned homopolymers are combined.

The copolymer may an anionic component and/or a nonionic component therein, as far as the total electric charge thereof is cation-rich.

Among the polymer containing the quaternary ammonium, a copolymer, a mixture of monopolymers, and a polymer formed of a homopolymer are preferable, the mixture of homopolymers and the polymer formed of a homopolymer are more preferable, and the polymer formed of the homopolymer is particularly preferable.

Moreover, the copolymer containing strong base polymers such as polydiallyldimethyl ammonium, polydiallylmethylethyl ammonium, and quaternary ammonium is preferable, since it contributes to ionization of the gas of the volatile solute.

The polymer is also selected depending on the intended use of the resulting purified water. In the case where the purified water is used as drinking water, for example, the polymer is preferably polyacrylic acid, polymaleic acid, and the like, because they are used as food additives.

A weight average molecular weight of the polymer is suitably selected depending on the intended purpose without any restriction, but it is preferably 1,000 to 5,000,000, more preferably 3,000 to 1,000,000, even more preferably 5,000 to 250,000, and particularly preferably 20,000 to 230,000. Moreover, as the weight average molecular weight of the polymer, the range of 5,000 to 130,000 is also preferable. When the weight average molecular weight of the polymer is less than 1,000, the polymer may leak into the targeted water. When it is more than 5,000,000, the viscosity of the polymer is high, and the solubility thereof decreases. Therefore, the osmotic pressure of the resulting aqueous solution may decrease, which decreases permeation flow rate at the tile of the dilution process. When the weight average molecular weight of the polymer is within the aforementioned particularly preferable range, the polymer does not leak into the targeted water through the semi-permeable membrane, and the volatile solute and the polymer can be separated at low pressure. Therefore, it is advantageous.

If a monomer is used instead of the polymer, the monomer may leaks into the is targeted water, and at this time, the volatile solute (the volatile anion or volatile cation) used for electric neutralization also leaks into the targeted water. In addition, the monomer and the volatile solute cannot be easily separated at low energy by the separating unit.

The number of repeat units in the polymer is suitably selected depending on the intended purpose without any restriction, but it is preferably 5 to 10,000, more preferably 10 to 5,000, and even more preferably 70 to 1,000. When the number of the repeat units is less than 5, the volume of the polymer itself is small, and thus the resulting polymer acts like a monomer and may leak into the targeted water. When it is more than 10,000, the resulting polymer may have poor solubility to water. When the number of repeat units in the polymer is within the aforementioned even more preferable range, the leaks thereof are prevented due to the volume thereof, but at the same time, the solubility of the polymer to water can be maintained. Therefore, it is advantageous.

A ratio (molecular weight of the repeat unit/electric charge) of the polymer is suitably selected depending on the intended purpose without any restriction, but it is preferably 58 to 1,000, more preferably 58 to 500, even more preferably 58 to 200, and particularly preferably 58 to 184. When the aforementioned ratio of the polymer is less than 58, the polymer cannot exist as an anionic or cationic polymer. When it is more than 1,000, an amount of the volatile solute, which can be trapped by the electric force of the polymer, reduces. When the aforementioned ratio of the polymer is within the aforementioned particularly preferable range, it is advantageous because a large amount of the volatile solute can be trapped by the electric force of the polymer.

--Other Substance--

Other substances are suitably selected depending on the intended purpose without any restriction, provided that they do not adversely affect the obtainable effects of the present invention. In the case where the resulting purified water is used as drinking water, examples of other substances include saccharides, salts, and metal ions.

Other substances can also be suitably selected depending on the separation method to be applied. In the case where the separation is performed by magnetic force, examples thereof include particles modified with magnetic beads or the like.

In the case where the separation is performed by the ultrafiltration membrane, examples thereof include a polymer which can be separated by the membrane. In the case where the separation is performed by electrodialysis, examples thereof include a small amount of monomers.

-Semi-Permeable Membrane-

The semi-permeable membrane is suitably selected depending on the intended purpose without any restriction in terms of its material, shape, size, structure, and the like, but it is preferably a forward osmosis semi-permeable membrane, which selectively pass water through.

The forward osmosis semi-permeable membrane is suitably selected depending on the intended purpose without any restriction, provided that it has semi-permeability. Examples of the material for the forward osmosis semi-permeable membrane include cellulose acetate, aromatic polyamide, aromatic polysulfone, and polybenzoimidazole. Examples of the shape thereof include a flat membrane, a spiral module using a flat membrane, a hollow fiber module, and a tubular module.

<Separating Unit and Separating Step>

The separating step is separating the volatile solute and the polymer from the diluted aqueous solution, which has been diluted by the diluting unit, so as to obtain purified water. The separating step can be carried out by the separating unit.

The separating unit preferably contains a first separating unit and a second separating unit. Note that, the first separating unit and the second separating unit may be present as the same body, or separate bodies. In the case where the first separating unit and the second separating unit are separate bodies, they are connected to each other. Either the operation of the first separating unit or the operation of the second separating unit may be performed first. Also, the operation of the first separating unit and the operation of the second separating unit may be repeated.

-First Separating Unit and Second Separating Unit-

The first separating unit is a unit configured to separate the diluted aqueous solution, which has been diluted by the diluting unit, into an aqueous solution containing the volatile solute, and an aqueous solution containing the polymer.

The second separating unit is a unit configured to separate the volatile solute from the aqueous solution containing the volatile solute.

The first and second separating units are suitably selected depending on the intended purpose without any restriction on the mechanisms or structures thereof, provided that they can separate at least part of the volatile solute and polymer from the diluted aqueous solution, which has been diluted by the diluting unit. Examples thereof include a separation system using an ultrafiltration membrane (UF membrane), an electrodialysis system using an ion-exchange membrane, a magnetic separation system, a diffusion dialysis system using ion-exchange membrane, an ion-selective membrane distillation system, and a volatilization member.

Figure 3:
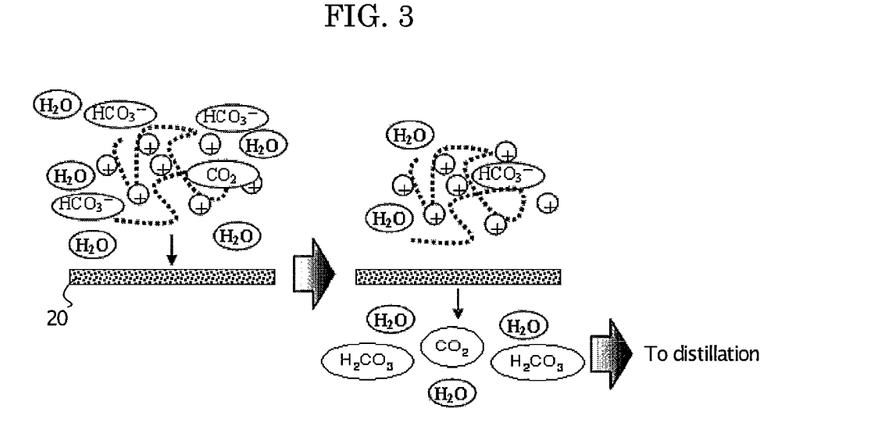
FIG. 3 is a schematic diagram showing a separation system using an ultrafiltration membrane, as the separating unit.
Figure 4:
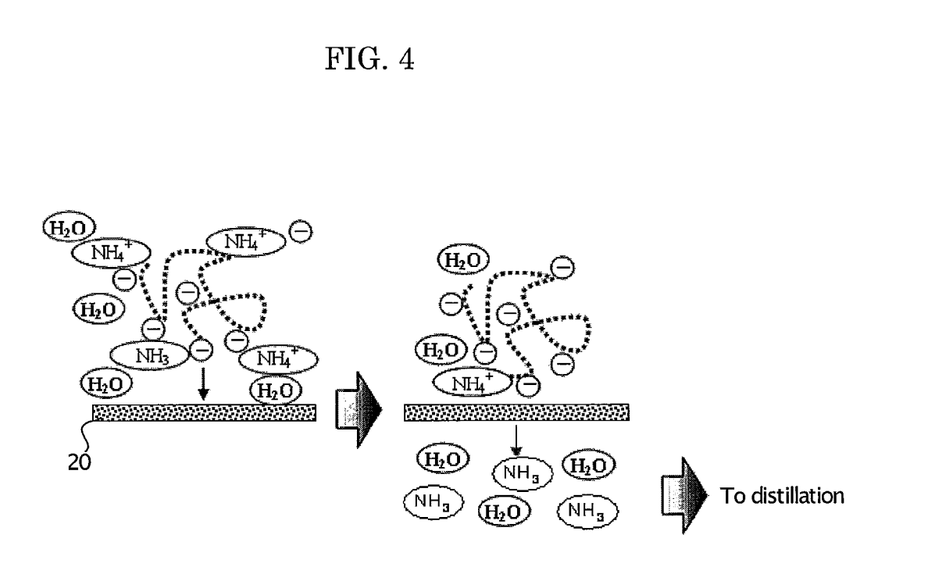
FIG. 4 is a schematic diagram showing a separation system using an ultrafiltration membrane, as the separating unit.

The separation system using the ultrafiltration membrane can be suitably used for the first separating unit. This is, as shown in FIGS. 3 and 4, a system where the volatile solute and the polymer are separated due to a difference in the molecular size between the volatile solute and the polymer, by bringing the diluted is aqueous solution containing the volatile solute and the polymer into contact with an ultrafiltration membrane. In FIGS. 3 and 4, "20" represents an ultrafiltration membrane.

It is preferred that pressure be applied in the course of the separation using the ultrafiltration membrane for increasing the separation speed. The pressure is suitably selected depending on the intended purpose without any restriction. To achieve the separation with low energy consumption, the pressure is preferably 1 atm. to 20 atm., more preferably 1 atm. to 10 atm., and even more preferably 1 atm. to 5 atm.

The separation system using the ultrafiltration membrane is advantageous since only polymers can be removed from the aqueous solution, even when two or more polymers are contained.

Figure 5:
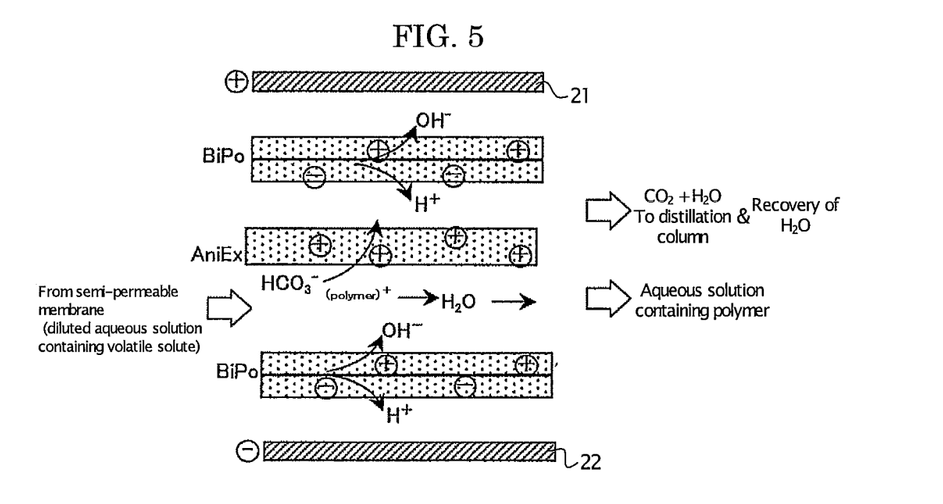
FIG. 5 is a schematic diagram showing an electrodialysis system using an ion-exchange membrane, as the separating unit.

As shown in FIG. 5, the electrodialysis system using the ion-exchange membrane is a system in which the diluted aqueous solution containing the volatile solute and the polymer is placed between an anion-exchange membrane and a cation-exchange membrane, a cathode 21 is provided at the outer side of the anion-exchange membrane, and an anode 22 is provided at the outer side of the cation-exchange membrane, and a voltage is applied between the electrodes 21 and 22. In the preferable embodiment, a bilayer including an anion-exchange membrane and a cation-exchange membrane (hereinafter, may be simply referred to as "bilayer") is provided between the anion-exchange membrane and the cathode, and is also provided between the cation-exchange membrane and the anode.

In the electrodialysis, volatile anions are attracted to the side of the cathode (the side of the anion-exchange membrane) by the application of voltage between the electrodes, to thereby selectively transport across the membrane for separation. At this time, protons are generated at the interface of the bilayer and attracted to the volatile anions as the counter ions of the volatile anions. As the counter ions of the cationic polymer, hydroxyl ions are generated by the interface of the bilayer, and attracted to the cationic polymer.

The electrodialysis requires more energy compared to the diffusion dialysis, but the materials or substances for use are not limited in terms of selections thereof and the separation speed can be sufficiently increased. Therefore, it is advantageous.

Figure 8:
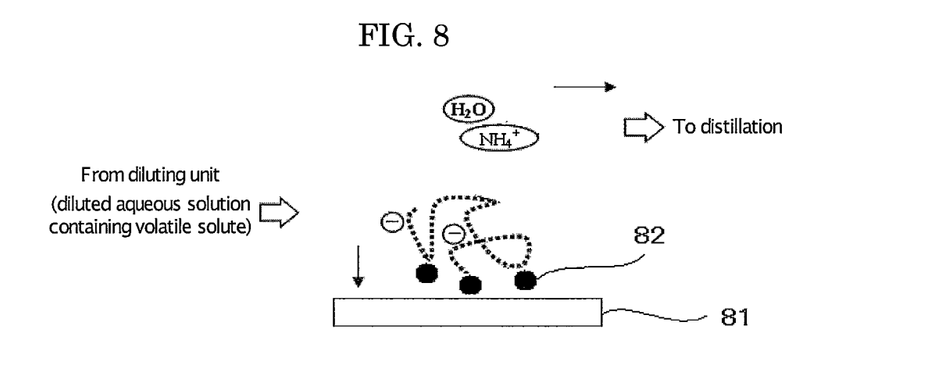
FIG. 8 is a schematic diagram showing a magnetic separation system, as the separating unit.

The magnetic separation is carried out, for example, in the following manner as shown in FIG. 8. At first, the anionic polymer is made bear magnetic beads 82, and a magnetic field is externally applied (for example by a magnet 81) thereto so that the anionic polymer is attracted, and separated.

Although the magnetic separation needs to make the polymer bear the magnetic beads or the like, separation and collection can be performed simply by applying a magnetic field. Moreover, the magnetic separation can be used in combination with the ultrafiltration membrane, and thus it is advantageous.

Figure 6:
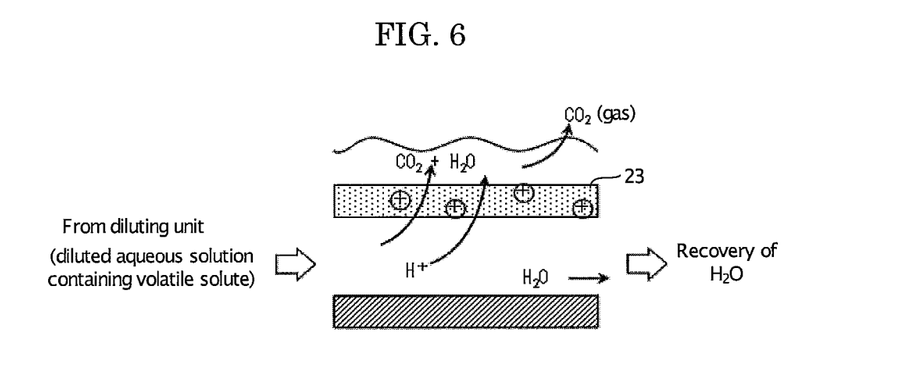
FIG. 6 is a schematic diagram showing a diffusion dialysis system using an ion-exchange membrane, as the separating unit.

The diffusion dialysis system using the ion-exchange membrane is, as shown in FIG. 6, a system in which the diluted aqueous solution containing volatile ions is brought into contact with the front side of the anion-exchange membrane 23, and pure water is brought into contact with the back side of the anion-exchange membrane 23, so that the volatile anions are selectively passed through the membrane according to the concentration deviation of the volatile anion. Here, the proton (H+) is selectively passed through the membrane as the counter ion of the volatile anion, because the size thereof is small.

The diffusion dialysis using the ion-exchange membrane is advantageous in view of energy consumption, because the permeation of the volatile anion can be achieved without using any external power. In the diffusion dialysis, the anion-exchange membrane requires high selectivity on the protons and volatile cations for use.

Figure 7:
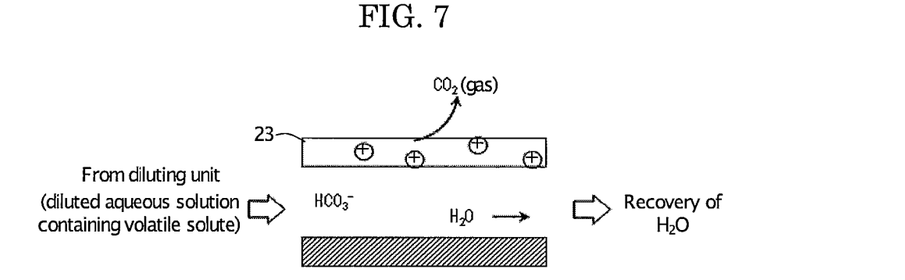
FIG. 7 is a schematic diagram showing an ion-selective membrane distillation system, as the separating unit.

The ion-selective membrane distillation system is, as shown in FIG. 7, a system in which the diluted aqueous solution containing the volatile ion is brought into contact with the anion-exchange membrane 23, as in the case of the diffusion dialysis. Here, air is brought into contact with the back side of the anion-exchange membrane 23, not pure water, to thereby volatilize the volatile anion at the interface of the membrane.

Note that, the ion-selective membrane distillation can be performed similarly with a cation-exchange membrane, and it is also possible to use both an anion-exchange membrane and a cation-exchange membrane.

The volatilizing member is suitably selected depending on the intended purpose without any restriction. Examples thereof include a commonly used distillation column, a distillation device, a membrane process unit, and a control unit of a micro fluid such as a microreactor. Among them, the distillation column is particularly preferable. The volatilizing member is suitably used as the second separating unit.

The distillation column is suitably selected depending on the intended purpose without any restriction. Examples thereof include a plate column, and a packed column.

The plate column is, for example, selected from the structures described in "Distillation Technology (edit. The Society of Chemical Engineers)" pp. 139-143, "Illustrative Chemical Engineering", published by Baifukan Co., Ltd., pp. 141-142. Specific examples thereof include a bubble-cap tray, bubble-tray, and a porous plate (sieve) tray.

The packing for the packed column may be regulated packing or not regulated packing. The packing for use can be suitably selected, for example, from those described in "Illustrative Chemical Engineering", published by Baifukan Co., Ltd., pp. 155-157, and "Gas Absorption, the enlarged edition" published by Kagaku Kogyo Sha Co. Ltd., pp. 221-242.

For the membrane process unit, for example, a membrane distillation unit described in "Journal of Membrane Science", vol. 124, Issue 1, pp. 1-25, can be used.

For the microreactor, for example, a reactor described in "Technology and Application of MicroChemical Chip" published by Maruzen Company, Limited., can be used.

As the separating unit, the units mentioned above may be used independently, or in combination.

<Dissolving Unit and Dissolving Step>

The dissolving step is returning the volatile solute, which has been separated by the separating unit, to an aqueous solution containing the separated polymer, and allowing the returned volatile solute to dissolve in the aqueous solution containing the polymer. The dissolving step can be carried out by the dissolving unit.

The dissolving unit is suitably selected from devices used for absorbing common gases depending on the intended purpose without any restriction. For example, the dissolving unit is suitably selected from the devices, units, and conditions described in "Gas Absorption, the enlarged edition" published by Kagaku Kogyo Sha Co. Ltd., pp. 49-54, pp. 83-144. Specific examples thereof include a system using an absorber, a packed column, a plate column, a spray column, a flow packed column, or the like, a fluid-membrane cross flow contact system, a high-speed swirling flow system, and a system using a mechanical force. Moreover, a thin gas-fluid layer may be formed using a control unit of micro fluid such as a microreactor, a membrane reactor, or the like for absorption.

The packing for the packed column may be a regulated filing or not regulated packing, and is suitably selected from the packing described in "Gas Absorption, the enlarged edition" published by Kagaku Kogyo Sha Co. Ltd., pp. 221-242.

Materials for the component parts, such as the packing, column, distributor, and support may be suitably selected depending on the intended purpose without any restriction. Examples thereof include: steel materials such as stainless steel, and aluminum killed steel; non-iron materials such as titanium and aluminum; ceramics such as glass, and alumina; and materials of such as carbon, synthetic polymer, and rubber. Moreover, the absorber is suitably selected depending on the purpose, such as for the volatile anion, and for the volatile cation. Furthermore, a plurality of gas absorbers may be used for the types of the gases for use.

-Other Steps and Other Units-

Examples of other steps include a controlling step, and a driving step. The controlling step and the driving step can be carried out by a controlling unit and a driving unit, respectively.

The controlling unit is suitably selected depending on the intended purpose without any restriction, provided that it can control the motions of each unit. Examples thereof include devices, such as a sequencer, and a computer.

<First Embodiment>

Figure 2:
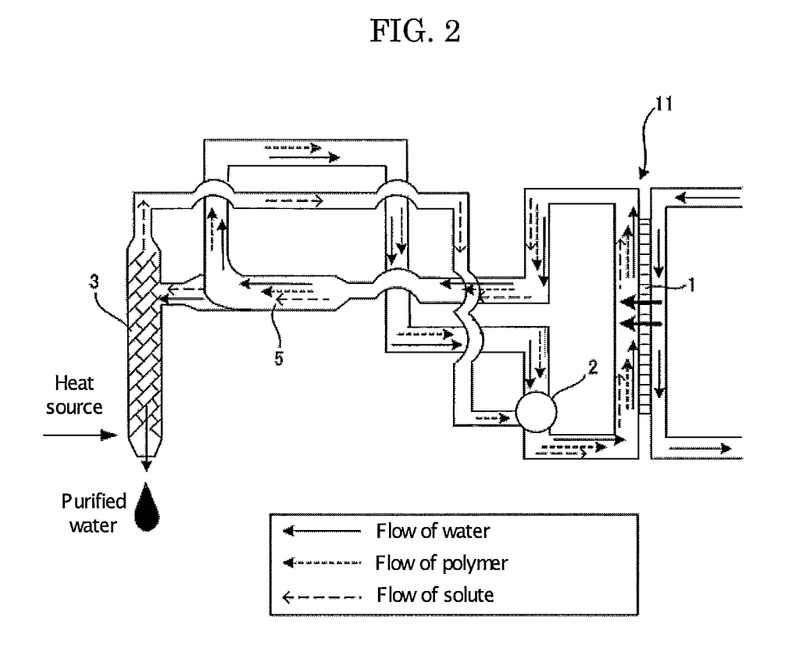
FIG. 2 is a schematic diagram showing one example of the water purifier of the present invention.

FIG. 2 is a schematic diagram showing a first embodiment of the water purifier of the present invention. The water purifier shown in FIG. 2 contains a s diluting unit 11 containing a forward osmosis semi-permeable membrane 1, a separating unit containing a first separating unit 5 and a second separating unit 3, and a dissolving unit 2.

For the water purifier of FIG. 2, either carbon dioxide or ammonium can be used as the volatile solute, and a polymer suitable for carbon oxide or ammonium can be used as the polymer.

Moreover, a membrane (hereinafter, may be referred to as "HT membrane") built in Expedition (manufactured by Hydration Technology Innovations) is used as the forward osmosis semi-permeable membrane 1.

The ultrafiltration membrane shown in FIG. 3 or 4 is used as the first separating unit 5, and a distillation column connected to the first separating unit 5 is used as the second separating unit 3.

A gas absorber is used as the dissolving unit 2 in the water purifier of FIG. 2.

In the water purifier of FIG. 2, the aqueous solution containing the volatile solute and the polymer is brought into contact with the targeted water for purification via a semi-permeable membrane to separate water from the targeted water, and the aqueous solution containing the volatile solute and the polymer is diluted with the separated water.

Next, the volatile solute and the polymer are separated from the diluted aqueous solution to obtain purified water.

The separated volatile solute is returned to the aqueous solution containing the polymer to regenerate the aqueous solution containing the volatile solute and the polymer.

As a result, purification of water can be efficiently performed while preventing the volatile solute from leaking into the targeted water from the aqueous solution containing the volatile solute, and obtaining water by using osmotic pressure.

EXAMPLES

Examples of the present invention will be explained hereinafter, but these examples shall not be construed as limiting the scope of the present invention.

Example 1-1

A water purifier shown in FIG. 2 was constructed using members listed below.

Pure water was used as targeted water for purification.

Polyacrylic acid 5,000 manufactured by Wako Pure Chemical Industries, Ltd. (weight average molecular weight (Mw):5,000, number of repeat units: 70, a molecular weight of the repeat unit/electric charge: 72) was used as a polymer.

Ammonium water (25%) manufactured by Wako Pure Chemical Industries, Ltd. was used as a volatile solute.

An aqueous solution containing the ammonium (0.5 mol/L) and the polymer (36 g/L) was used as an aqueous solution containing the volatile solute and the polymer.

A HT membrane was used as a semi-permeable membrane 1.

A first separating unit, and a second separating unit connected to the first separating unit were used as a separating unit.

A UF membrane GH2540F manufactured by GE W & PT DESAL was used for the first separating unit, and separation was performed under the following conditions.

Conditions for the separation by the UF membrane:

The diluted aqueous solution was separated via the UF membrane under the pressure (10 atm.).

As the second separating unit, a distillation column in which a structured packing (product name: Laboratory Packing EX, manufacturer: Sulzer Chemteck Ltd.) was placed was used at 80° C.

As the dissolving unit 2, an absorption column in which Laboratory Packing EX was placed was used.

As the heat source, a mantle heater of 200V was used.

Example 1-2

A water purified was prepared in the same manner as in Example 1-1, provided that JURYMER AC-10L (polyacrylic acid manufactured by Nihon Junyaku Co., Ltd., weight average molecular weight: 20,000, number of the repeat units: 280, molecular weight of the repeat unit/electric charge: 72) was used as the polymer instead of polyacrylic acid 5,000, UC005 (manufactured by DAICEN MEMBRANE-SYSTEMS Ltd.) was used as the UF membrane of the first separating unit instead of GH2540F (GE W& PT DESAL), and the pressure applied at the time of the separation by the UF membrane was changed from 10 atm. to 5 atm.

Example 1-3

A water purifier was prepared in the same manner as in Example 1-2, provided that polyacrylic acid 25,000 (polyacrylic acid manufactured by Wako Pure Chemical Industries, Ltd., weight average molecular weight: 25,000, number of the repeat units: 350, molecular weight of the repeat unit/electric charge: 72) was used as the polymer instead of JURYMER AC-10L.

Example 1-4

A water purifier was prepared in the same manner as in Example 1-2, provided that polyacrylic acid 250,000 (polyacrylic acid manufactured by Wako Pure Chemical Industries, Ltd., weight average molecular weight: 250,000, number of the repeat units: 3,500, molecular weight of the repeat unit/electric charge: 72) was used as the polymer instead of JURYMER AC-10L.

Note that the polymer could not dissolve at a concentration of 144 g/L or higher. Namely, ammonium of 2 M or higher leaked into the targeted water, and thus water could not be collected from an aqueous solution of high concentration, such as sea-water.

Example 1-5

A water purifier was prepared in the same manner as in Example 1-2, provided that polyacrylic acid 1,000,000 (polyacrylic acid manufactured by Wako Pure Chemical Industries, Ltd., weight average molecular weight: 1,000,000, number of the repeat units: 14,000, molecular weight of the repeat unit/electric charge: 72) was used as the polymer instead of JURYMER AC-10L, and the concentration of the polymer in the aqueous solution containing the volatile solute and the polymer was changed from 36 g/L to 7.2 g/L.

Note that, the polymer of Example 1-5 was insoluble to the aqueous solution containing the volatile solute and the polymer at the concentration thereof of 36 g/L, and was soluble to the aqueous solution at the concentration thereof of 7.2 g/L. Based on this, it was found that the ammonium of 0.5 M or higher was leaked into the targeted water, and thus water could not be collected from an aqueous solution of high concentration, such as sea-water.

Example 1-6

A water purifier was prepared in the same manner as in Example 1-2, provided that polyacrylic acid, Product No. 323667 (polyacrylic acid manufactured by Sigma-Aldrich Corporation, weight average molecular weight: 1,800 or less, number of the repeat units: 25, molecular weight of the repeat unit/electric charge: 72) was used as the polymer instead of JURYMER AC-10L.

Example 1-7

A water purifier was prepared in the same manner as in Example 1-2, provided that polyacrylic acid, Product No. 181293 (polyacrylic acid manufactured by Sigma-Aldrich Corporation, weight average molecular weight: 130,000, number of the repeat units: 1,800, molecular weight of the repeat unit/electric charge: 72) was used as the polymer instead of JURYMER AC-10L.

Example 2

A water purifier was prepared in the same manner as in Example 1-2, provided that 36 g/L of JURYMER AC-10L for use as the polymer was replaced with 92 g/L of polystyrene sulfonate (polystyrene sulfonate manufactured by Polysciences, Inc., weight average molecular weight: 70,000, number of the repeat units: 380, molecular weight of the repeat unit/electric charge: 184).

Example 3

A water purifier was prepared in the same manner as in Example 1-1, provided that 36 g/L of polyacrylic acid 5,000 for use as the polymer was replaced with 29.5 g/L of polymaleic acid (polymaleic acid manufactured by Polysciences Inc., weight average molecular weight: 1,000, number of the repeat units: 8, molecular weight of the repeat unit/electric charge: 58), the UF membrane used for the first separating unit was changed from GH2540F (manufactured by GE W& PT DESAL) to GE2540F (manufactured by GE W& PT DESAL), and the pressure applied at the time of the separation by the UF membrane was changed from 10 atm. to 20 atm.

Example 4

A water purifier was prepared in the same manner as in Example 1-2, provided that JURYMER AC-10L used as the polymer, and a 25% ammonium water used as the volatile solute were respectively replaced with quaternary ammonium polymer and carbon dioxide prepared in the following manner.

-Quaternary Ammonium Polymer and Carbon Dioxide-

As the quaternary ammonium polymer, polydiaryldimethylammonium chloride having a repeat unit expressed by the following structural formula 1 (manufactured by Polysciences) was used. The quaternary ammonium polymer was subjected to dialysis using a dialysis membrane (manufactured by PIERCE) to remove chlorides, while mixing carbon dioxide by bubbling using a carbon dioxide cylinder (manufactured by Tomoe Shokai Co., Ltd.) so that the chlorides were replaced with carbonic acid ions, to thereby obtain 63.5 g/L of the polymer of Example 4, and 0.5 M of the volatile solute.

The polymer of Example 4 had a weight average molecular weight of 40,000, a number of repeat units of 270, and a ratio a molecular weight of the repeat unit/electric charge of 113. Note that, the repeat unit was a structure expressed by the following structural formula 1 from which a Cl⁻ ion was removed.

Structural Formula 1

Example 5

A water purifier was prepared in the same manner as in Example 1-2, provided that 36 g/L of JURYMER AC-10L used as the polymer was changed to a mixture of 18 g/L of polyacrylic acid 25,000 (polyacrylic acid manufactured by Wako Pure Chemical Industries, Ltd., weight average molecular weight: 25,000, number of the repeat units: 350, molecular weight of the repeat unit/electric charge: 72) and 46 g/L of polystyrene sulfonate (polystyrene sulfonate manufactured by Polysciences, weight average molecular weight: 70,000, number of repeat units: 380, molecular weight of the repeat unit/electric charge: 184).

Example 6

A water purifier was prepared in the same manner as in Example 1-2, provided that 36 g/L of JURYMER AC-10L used as the polymer was changed to 103 g/L of CMD-D40 (carboxymethyl dextran manufactured by Meito Sangyo Co., Ltd., weight average molecular weight: 40,000, number of repeat units: 195, molecular weight of the repeat unit/electric charge: 206).

Comparative Example 1

A water purifier was prepared in the same manner as in Example 1-2, provided that the aqueous solution containing the volatile solute and the polymer was replaced with an aqueous solution containing carbon dioxide (0.35 M) and ammonium (0.5 M), which had been prepared by mixing carbon dioxide (manufactured by Tomoe Shokai Co., Ltd.) into ammonium water (in which ammonium was diluted with pure water to 25%) by bubbling.

Comparative Example 2

A water purifier was prepared in the same manner as in Example 1-2, provided that the aqueous solution containing the volatile solute and the polymer was replaced with an ammonium hydrogen carbonate (0.5M) aqueous solution (manufactured by Wako Pure Chemical Industries, Ltd.).

Comparative Example 3

A water purifier was prepared in the same manner as in Example 1-2, provided that the aqueous solution containing the volatile solute and the polymer was replaced with an aqueous solution containing trishydroxyethylmethyl ammonium (0.5 M) and carbon dioxide (0.5 M), which had been prepared by bubbling carbon dioxide in trishydroxyethylmethyl ammonium (manufactured by Tokyo Chemical Industry Co., Ltd.).

<Evaluation>

The water purifiers of Examples 1-1 to 6 and Comparative Examples 1 to 3 were each evaluated in terms of leaking of the volatile solute to the targeted water and the osmotic pressure of the aqueous solution containing the volatile solute and the polymer, in the following manners.

-Leaking of Volatile Solute to Targeted Water for Purification-

The amount of the ammonium in the circulated targeted water (pure water) for purification was measured by an ammonium electrode (manufactured by DKK-TOA Corporation) and the amount of the carbon dioxide therein was measured by a carbonic acid electrode (manufactured by DKK-TOA Corporation). Based on these measurements, a leaked amount of the volatile solute was calculated.

-Permeate Flow Rate of Targeted Water for Purification-

The permeate flow rate of the targeted water was evaluated in the following manner.

Weights of the aqueous solution containing the volatile solute and the polymer after circulation (draw solution of the solution) was measured, and a permeate flow rate of the targeted water was calculated using the area of the forward osmosis semi-permeable membrane.

Based on the permeate flow rate, the osmotic pressure of the aqueous solution containing the volatile solute and the polymer can be evaluated.

The results of the ratio of the permeate flow rate to the leaked amount of the volatile solute are shown in Table 1, and the values presented therein are based on the comparison to the result of Comparative Example 1 where the result of Comparative Example is determined to be 1.

TABLE 1

| | Permeate flow rate/ Leaked amount of volatile solute |
|---|---|
| Ex. 1-1 | 59 |
| Ex. 1-2 | 59 |
| Ex. 1-3 | 58 |
| Ex. 1-4 | 55 |
| Ex. 1-5 | 50 |
| Ex. 1-6 | 5 |
| Ex. 1-7 | 57 |
| Ex. 2 | 184 |
| Ex. 3 | 3 |
| Ex. 4 | 4 |
| Ex. 5 | 120 |
| Ex. 6 | 40 |
| Comp. Ex. 1 | 1 |
| Comp. Ex. 2 | 1 or less |
| Comp. Ex. 3 | 1.5 |

From the results shown in Table 1, it was found that the water purifiers of Examples 1-1 to 6, each using the aqueous solution containing the volatile solute and the polymer, could efficiently perform water purification, at the same time as preventing the volatile solute from leaking into the targeted water from the aqueous solution containing the same, and collecting water by utilizing osmosis, compared to the water purifiers of Comparative Examples 1 to 3. In addition, as seen from the results of Examples 1-1 to 1-7 using ammonium as the volatile solute and polyacrylic acid as the polymer, the water purifiers of Examples 1-1 to 1-4 and 1-7, each using the polymer having a weight average molecular weight of 5,000 to 250,000 had a particularly preferable effect on the prevention of the leakage of the volatile solute into the targeted water.

The water purifier and water purification method of the present invention are described in details above, but the present invention shall not construed as to limit to Examples presented above, and various changes and modification may be added thereto as far as they belong to the concept of the present invention.

The water purifier and water purification method of the present invention can efficiently purify water while preventing the volatile solute from leaking into the targeted water from the aqueous solution containing the same, and collecting water by using osmotic pressure. Therefore, the water purifier and water purification of the present invention can be used for purifying various types of water, and especially suitably used for purifying sea-water.

What is claimed is:

1. A water purifier, comprising:
   a diluting unit configured to bring targeted water for purification into contact with an aqueous solution containing a volatile solute and a polymer via a semi-permeable membrane so as to separate water from the targeted water by the semi-permeable membrane, and configured to dilute the aqueous solution with the separated water;
   a separating unit configured to separate the volatile solute and the polymer from the diluted aqueous solution obtained by the diluting unit so as to obtain purified water; and
   a dissolving unit configured to return the volatile solute separated by the separating unit to an aqueous solution containing the separated polymer, and to allow the separated volatile solute to dissolve in the aqueous solution containing the polymer;
   wherein the volatile solute is either volatile anions or volatile cations;
   wherein the volatile solute is volatile cations when the polymer is an anionic polymer; and
   wherein the volatile solute is volatile anions when the polymer is a cationic polymer.

2. The water purifier according to claim 1, wherein the separating unit contains a first separating unit configured to separate the diluted aqueous solution into an aqueous solution containing the volatile solute and an aqueous solution containing the polymer, and a second separating unit configured to separate the volatile solute from the aqueous solution containing the volatile solute.

3. The water purifier according to claim 2, wherein the first separating unit is an ultrafiltration membrane.

4. The water purifier according to claim 1, wherein the volatile solute is carbon dioxide, carbonic acid, or ammonium.

5. The water purifier according to claim 1, wherein the polymer has a weight average molecular weight of 5,000 to 250,000.

6. The water purifier according to claim 1, wherein the polymer has a weight average molecular weight of 5,000 to 130,000.

7. The water purifier according to claim 1, wherein the polymer has a ratio of a molecular weight of a repeat unit therein to electric charge therein ranging from 58 to 1,000.

8. The water purifier according to claim 1, wherein the dissolving unit is a gas absorber.

9. The water purifier according to claim 1, wherein the semi-permeable membrane is a forward osmosis semi-permeable membrane which selectively passes water through.

10. The water purifier according to claim 1, wherein the targeted water is sea-water.

11. A water purification method, comprising:
    bringing targeted water for purification into contact with an aqueous solution containing a volatile solute and a polymer via a semi-permeable membrane so as to separate water from the targeted water by the semi-permeable membrane, and diluting the aqueous solution containing the volatile solute and the polymer with the separated water;
    separating the volatile solute and the polymer from the diluted aqueous solution so as to obtain purified water; and
    returning the separated volatile solute to an aqueous solution containing the separated polymer, and allowing the separated volatile solute to dissolve in the aqueous solution containing the polymer;
    wherein the volatile solute is either volatile anions or volatile cations;
    wherein the volatile solute is volatile cations when the polymer is an anionic polymer; and
    wherein the volatile solute is volatile anions when the polymer is a cationic polymer.

* * * * *